United States Patent
Amann et al.

(10) Patent No.: US 9,957,809 B2
(45) Date of Patent: May 1, 2018

(54) MODIFIED INTERFACE AROUND A HOLE

(75) Inventors: Christian Amann, Bottrop (DE); Thomas Beck, Panketal (DE); Björn Beckmann, Duisburg (DE); Andreas Böttcher, Mettmann (DE); Winfried Esser, Bochum (DE); Giuseppe Gaio, Bonn (DE); Rudolf Küperkoch, Essen (DE); Eckart Schumann, Mülheim an der Ruhr (DE); Rostislav Teteruk, Mülheim an der Ruhr (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 484 days.

(21) Appl. No.: 14/356,464

(22) PCT Filed: Sep. 14, 2012

(86) PCT No.: PCT/EP2012/068058
§ 371 (c)(1),
(2), (4) Date: Aug. 19, 2014

(87) PCT Pub. No.: WO2013/075858
PCT Pub. Date: May 30, 2013

(65) Prior Publication Data
US 2014/0349065 A1    Nov. 27, 2014

(30) Foreign Application Priority Data
Nov. 24, 2011  (EP) .................................. 11190431

(51) Int. Cl.
| B32B 3/24 | (2006.01) |
| F01D 5/18 | (2006.01) |
| F01D 5/28 | (2006.01) |

(52) U.S. Cl.
CPC .............. *F01D 5/186* (2013.01); *F01D 5/18* (2013.01); *F01D 5/28* (2013.01); *F01D 5/288* (2013.01); *F05D 2230/90* (2013.01); *F05D 2260/22141* (2013.01); *Y02T 50/676* (2013.01); *Y10T 428/24273* (2015.01); *Y10T 428/24322* (2015.01)

(58) Field of Classification Search
CPC ...... F01D 5/186; F01D 5/288; F05D 2230/90; Y10T 428/24273
See application file for complete search history.

(56) References Cited

U.S. PATENT DOCUMENTS 5,458,461 A    10/1995   Lee
5,558,922 A *  9/1996    Gupta ....................... C23C 4/02
                                                          29/889.1

(Continued)

FOREIGN PATENT DOCUMENTS

DE    102007038858 A1    3/2008
DE    102009003634 A1    10/2009

(Continued)

*Primary Examiner* — William P Watkins, III
(74) *Attorney, Agent, or Firm* — Beusse Wolter Sanks & Maire

(57) ABSTRACT

A layer system including a substrate and a layer is provided. The layer system has a hole at least in the layer, and wherein at least one recess is present in a surface of the layer in a vicinity around the hole or directly adjoining a boundary line of the hole.

13 Claims, 5 Drawing Sheets

(56) References Cited

U.S. PATENT DOCUMENTS

| | | | |
|---|---|---|---|
| 6,024,792 A | 2/2000 | Kurz et al. | |
| 6,692,338 B1 * | 2/2004 | Kirchner | B24B 37/26 257/E21.23 |
| 7,553,534 B2 | 6/2009 | Bunker | |
| 8,079,806 B2 * | 12/2011 | Tholen | F01D 11/125 415/171.1 |
| 2005/0005512 A1 * | 1/2005 | Boxsell | A01G 31/02 47/39 |
| 2009/0246011 A1 | 10/2009 | Itzel | |
| 2010/0028128 A1 * | 2/2010 | Fischer | F01D 5/18 415/1 |
| 2011/0014060 A1 * | 1/2011 | Bolcavage | F01D 5/288 416/241 R |
| 2011/0243677 A1 * | 10/2011 | Janssen | B23C 3/00 409/64 |

FOREIGN PATENT DOCUMENTS

| | | |
|---|---|---|
| EP | 0486489 B1 | 11/1994 |
| EP | 0412397 B1 | 3/1998 |
| EP | 0892090 A1 | 1/1999 |
| EP | 0786017 B1 | 3/1999 |
| EP | 1091090 A2 | 4/2001 |
| EP | 1306454 A1 | 5/2003 |
| EP | 1319729 A1 | 6/2003 |
| EP | 1204776 B1 | 6/2004 |
| EP | 1942250 A1 | 7/2008 |
| EP | 1997581 A1 | 12/2008 |
| WO | 9967435 A1 | 12/1999 |
| WO | 0044949 A1 | 8/2000 |

* cited by examiner

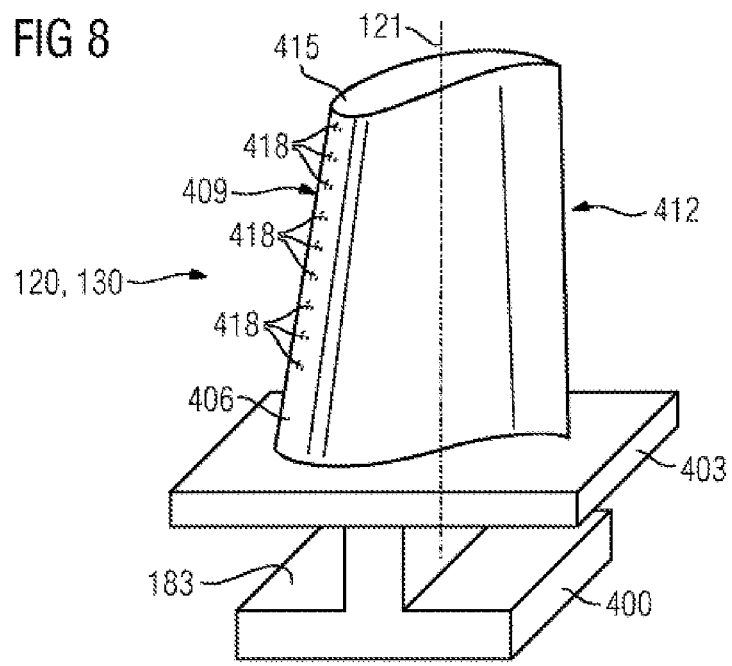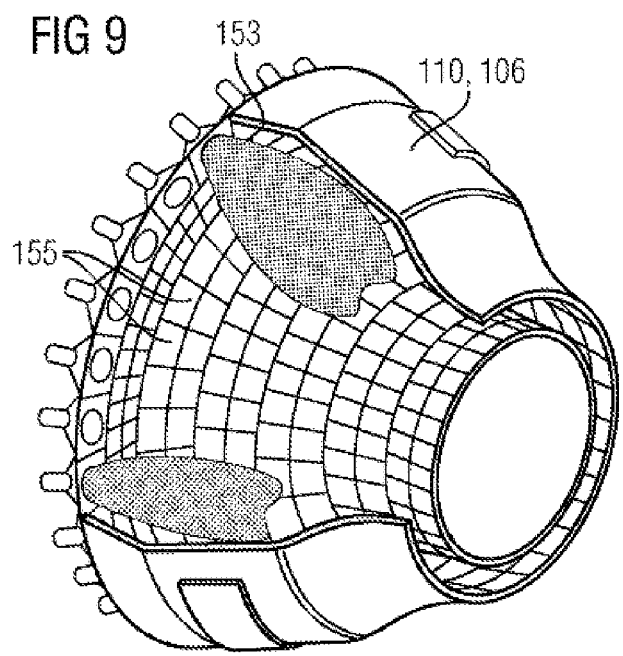

FIG 11

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <0.006 | 8.0 | Rem. | 4.6 | 0.6 | 8.0 | 6.0 | | 5.6 | 1.0 | <0.003 | <0.0075 | 0.10 |
| CMSX-3 | <0.006 | 8.0 | Rem. | 4.6 | 0.6 | 8.0 | 6.0 | | 5.6 | 1.0 | <0.003 | <0.0075 | 0.10 |
| CMSX-4 | | 6.0 | Rem. | 10.0 | 0.6 | 6.0 | 6.0 | | 5.6 | 1.0 | | Re=3.0 | |
| CMSX-6 | <0.015 | 10.0 | Rem. | 5.0 | 3.0 | <.10 | 2.0 | <.10 | 4.9 | 4.8 | <.003 | <.0075 | 0.10 |
| PWA 1480 SX | <0.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M 509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

MODIFIED INTERFACE AROUND A HOLE

CROSS REFERENCE TO RELATED APPLICATIONS

This application is the US National Stage of International Application No. PCT/EP2012/068058 filed Sep. 14, 2012, and claims the benefit thereof. The International Application claims the benefit of European Application No. EP11190431 filed Nov. 24, 2011. All of the applications are incorporated by reference herein in their entirety.

FIELD OF INVENTION

The invention relates to the modification of a surface around a hole in a layer system.

BACKGROUND OF INVENTION

Layer systems are used in particular for components operated at high temperatures. These are in particular turbine blades or vanes with a metallic substrate, metallic bonding layer and ceramic thermal barrier layer.

In addition, gas turbine components in particular are cooled by a cooling medium flowing out of a cooling hole in order to cool the component on the inside or else in order to protect the component on the outside against excessively hot gases.

Holes of this type are often made after complete coating of the substrate, in which case the opening can then be a flaw or starting point for crack growth on its inner face.

SUMMARY OF INVENTION

It is therefore an object of the invention to solve the problem mentioned above.

This object may be achieved by one or more recesses around the hole as claimed in the independent claim.

The dependent claims list further advantageous measures which can be combined with one another, as desired, in order to achieve further advantages.

BRIEF DESCRIPTION OF THE DRAWINGS

FIG. 8 shows a turbine blade or vane,
FIG. 9 shows a combustion chamber,
FIG. 11 shows a list of superalloys.

DETAILED DESCRIPTION OF INVENTION

The exemplary embodiments in the description represent merely exemplary embodiments of the invention.

Figure 1:
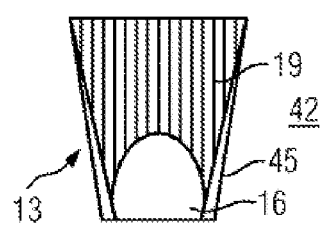
FIG. 1 shows a cooling hole according to the prior art.

FIG. 1 shows a plan view of a surface 42 of a layer 10 (FIG. 7) having a hole 13, which here in particular is in the form of a film-cooling hole.

There is a contour 45 around the hole 13 on the surface 42. The film-cooling hole 13 can have a radial bore 16 with a symmetrical or asymmetrical cross section. Depending on the application or location on the combustion chamber brick 155 (FIG. 9) or the turbine blade or vane 120, 130 (FIG. 8), the film-cooling hole 13 is formed with a diffuser 19.

Figure 7:
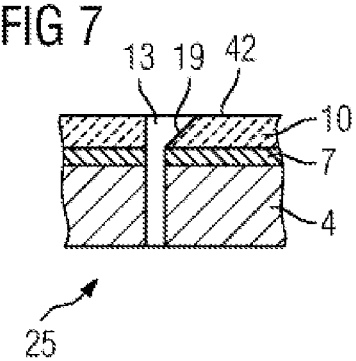
FIG. 7 shows a layer system.

The diffuser 19 constitutes a widening of the bottom portion 16 of the hole 13 (FIG. 7).

FIG. 7 shows a cross section through a layer system 25. The layer system 25 comprises a substrate 4.

The substrate 4 is preferably metallic and very particularly comprises nickel-based or cobalt-based superalloys.

In this respect, use is preferably made of alloys as shown in FIG. 11.

An outer ceramic layer 10, which represents the outermost surface 42, is applied to the substrate 4 directly or on a metallic bonding layer 7.

A hole 13, which can also have a diffuser 19, is present continuously through the layer system 25, i.e. through the layers 7, 10 and the substrate 4.

To solve the problem, recesses 28, 31, 33, 36 are introduced around the hole 13 or a plurality of holes in the component 25, 120, 130, 155, surrounding the hole 13 at least partially or completely.

The recesses 28, 31, 33, 36 can be introduced into the outer surface 42 or are correspondingly introduced in the metallic substrate 7 or in the substrate 4 so that a corresponding recess arises on the surface 42 during the subsequent coating.

Figure 2:
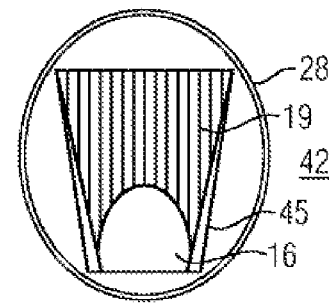
FIGS. 2-6 show exemplary embodiments of the invention.
Figure 5:
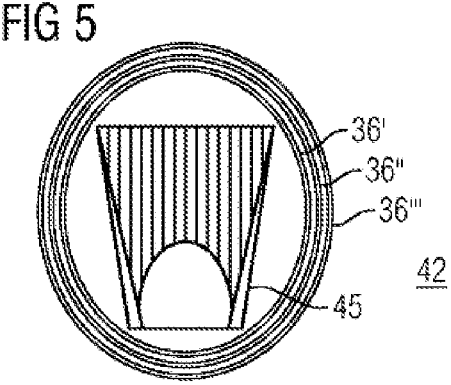

As shown in FIG. 2, the recess 28 has a closed, in particular curved line 28, preferably in the form of a circle or of an oval. In this respect, it is possible to use one or more recesses 36', 36", . . . (FIG. 5).

The recess 28 can make contact with the contour 45 of the opening of the hole 13 or can be spaced apart therefrom (applies to FIGS. 1, 2, 4, 5 and 6).

Figure 3:
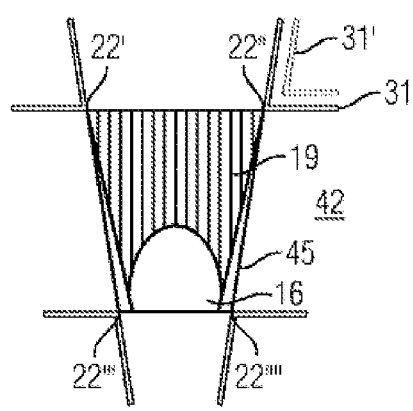

FIG. 3 shows a further exemplary embodiment of the invention. Here, a V-shaped or L-shaped recess 31, 31' is introduced proceeding from the corners 22' to 22"" of the contour 45 of the hole 13 or of the diffuser 19. The corner of the L or V shape 31, 31' preferably adjoins the corner 22', . . . of the hole 13 or diffuser 19.

Here, a second V or L shape 31, 31' can be present as a recess adjoining the first V or L shape 31, 31', as is indicated by dashed lines (this is represented here only by way of example for just one corner 22").

Figure 4:
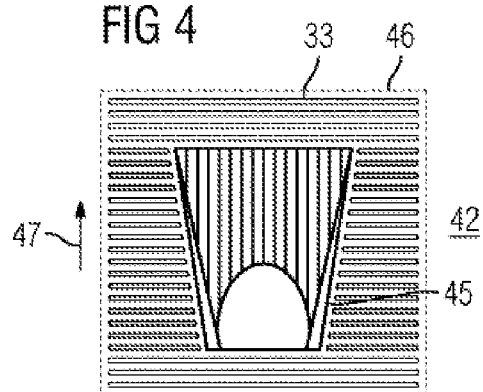

FIG. 4 shows a further exemplary embodiment of the invention. Here, the recesses 33 are preferably straight, non-closed lines and very particularly extend perpendicular to a direction of overflow 47 over the hole 13. However, this does not represent a restriction; it is similarly possible for the recesses 33 to run in the direction of overflow 47.

An imaginary circumference 46 (dashed lines) which is formed by the linear recesses 33 preferably has a square or rectangular form.

The recesses 33 occupy the area around the circumference 46 up to the contour 45 of the hole 13, i.e. they extend up to the contour 45 of the hole 13 or up to shortly before the contour 45.

Figure 6:
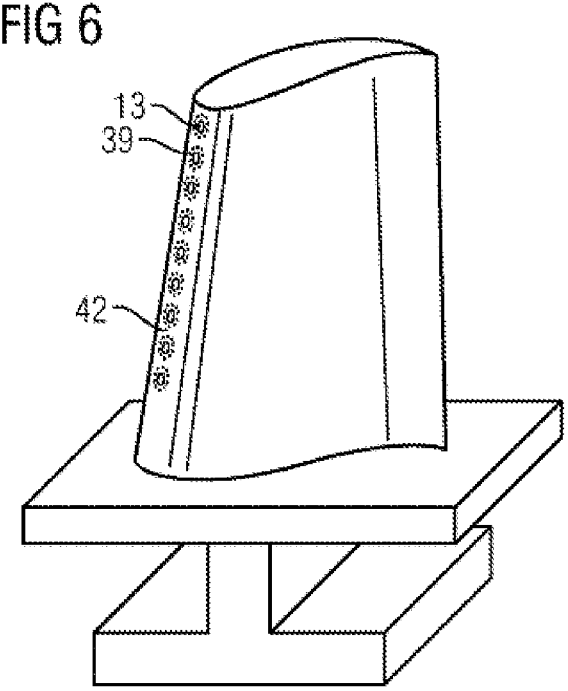

FIG. 6 shows a further exemplary embodiment of the invention. Here, the holes 39 represent the recesses, which extend along a certain profile around the hole 13.

The hole 13 is formed here, for example, on the leading edge of a turbine blade or vane 120, 130. These punctiform recesses 39 can likewise be applied to the exemplary uses shown in FIGS. 2 to 5, i.e. the punctiform recesses extend along the line or would give rise to interconnected lines as shown in FIGS. 2 to 5.

FIG. 8 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier layer, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier layer covers the entire MCrAlX layer.

Columnar grains are produced in the thermal barrier layer by suitable coating processes, such as for example electron beam physical vapor deposition (EB-PVD).

Other coating processes are possible, for example atmospheric plasma spraying (APS), LPPS, VPS or CVD. The thermal barrier layer may include grains that are porous or have micro-cracks or macro-cracks, in order to improve the resistance to thermal shocks. The thermal barrier layer is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 9 shows a combustion chamber 110 of a gas turbine.

The combustion chamber 110 is configured, for example, as what is known as an annular combustion chamber, in which a multiplicity of burners 107, which generate flames 156 and are arranged circumferentially around an axis of rotation 102, open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

A for example ceramic thermal barrier layer, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier layer by suitable coating processes, such as for example electron beam physical vapor deposition (EB-PVD).

Other coating processes are conceivable, for example atmospheric plasma spraying (APS), LPPS, VPS or CVD. The thermal barrier layer may include grains that are porous or have micro-cracks or macro-cracks, in order to improve the resistance to thermal shocks. Refurbishment means that after they have been used, protective layers may have to be removed from heat shield elements 155 (e.g. by sandblasting). Then, the corrosion and/or oxidation layers and products are removed. If appropriate, cracks in the heat shield element 155 are also repaired. This is followed by recoating of the heat shield elements 155, after which the heat shield elements 155 can be reused.

A cooling system may also be provided for the heat shield elements 155 and/or their holding elements, on account of the high temperatures in the interior of the combustion chamber 110. The heat shield elements 155 are then for example hollow and may also have cooling holes (not shown) which open out into the combustion chamber space 154.

Figure 10:
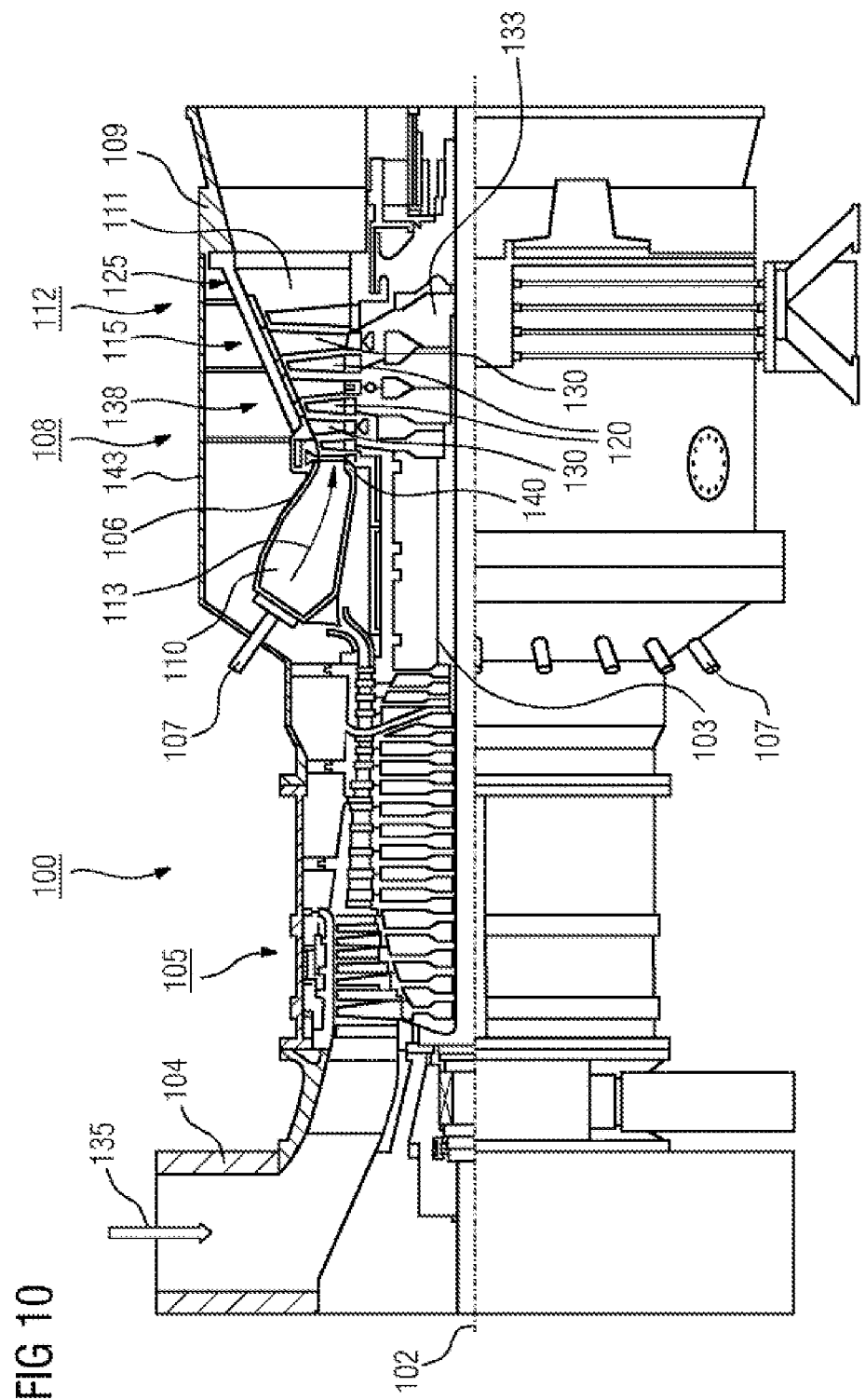
FIG. 10 shows a gas turbine.

FIG. 10 shows by way of example a partial longitudinal section through a gas turbine 100.

In its interior, the gas turbine 100 has a rotor 103 which is mounted such that it can rotate about an axis of rotation 102, has a shaft 101, and is also referred to as the turbine rotor.

An intake housing 104, a compressor 105, a for example toroidal combustion chamber 110, in particular an annular combustion chamber, with a plurality of coaxially arranged burners 107, a turbine 108 and the exhaust gas housing 109 follow one another along the rotor 103.

The annular combustion chamber 110 is in communication with a for example annular hot gas duct 111. There, by way of example, four successive turbine stages 112 form the turbine 108.

Each turbine stage 112 is formed for example from two blade or vane rings. As seen in the direction of flow of a working medium 113, a guide vane row 115 is followed in the hot gas duct 111 by a row 125 formed from rotor blades 120.

The guide vanes 130 are secured to an inner housing 138 of a stator 143, whereas the rotor blades 120 of a row 125 are fitted on the rotor 103, for example by means of a turbine disk 133.

A generator (not shown) is coupled to the rotor 103.

While the gas turbine 100 is operating, air 135 is drawn in through the intake housing 104 and compressed by the compressor 105. The compressed air provided at the turbine end of the compressor 105 is passed to the burners 107, where it is mixed with a fuel. The mixture is then burnt in the combustion chamber 110, forming the working medium 113. From there, the working medium 113 flows along the hot gas duct 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known for example from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

A thermal barrier layer, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier layer by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A layer system comprising:
   a substrate, and
   a layer,
   wherein the layer system comprises a hole at least in the layer,
   wherein the hole comprises a diffuser on a surface of the layer,
   wherein at least one recess is present in the surface of the layer in a vicinity around the hole or directly adjoining a boundary line of the hole, and
   wherein the at least one recess comprises:
      a discrete, continuous closed recess that fully encircles the hole, or
      plural discrete, continuous V-shaped or L-shaped recesses.

2. The layer system as claimed in claim 1, in which the at least one recess comprises the discrete, continuous closed recess that fully encircles the hole.

3. The layer system as claimed in claim 2, in which the at least one recess comprises a plurality of discrete, continuous and nested closed recesses, each of which fully encircles the hole.

4. The layer system as claimed in claim 1, in which the at least one recess comprises the plural discrete, continuous V-shaped or L-shaped recesses.

5. The layer system as claimed in claim 4 in which at least one location comprises a plurality of continuous V-shaped or L-shaped recesses arranged one inside another.

6. The layer system of claim 2, wherein the at least one recess comprises a round form or an oval form.

7. The layer system of claim 4, wherein a corner of a V-shaped or L-shaped recess adjoins one corner or rounded section of a contour of the hole.

8. The layer system of claim 7, wherein each corner of the hole adjoins a corner of a V-shaped or L-shaped recess of a respective location.

9. A layer system comprising:
a substrate,
a layer disposed on the substrate,
a film cooling hole through the substrate and the layer; and
a plurality of punctiform or dashed recesses that form a circle or oval in a surface of the layer around the film cooling hole.

10. A layer system comprising:
a substrate,
a layer on the substrate, the layer comprising a surface,
a diffuser disposed in the surface and defining a perimeter in the surface, the perimeter comprising corners,
a hole in the layer that opens into the diffuser, and
plural discrete recesses in the surface of the layer around the hole,
wherein each recess of the plural discrete recesses forms a continuous shape comprising two sides and a vertex and each recess being in a different respective location, wherein the vertex of each recess is oriented toward a corner of the perimeter.

11. The layer system of claim 10, wherein a vertex of each recess adjoins a respective corner of the perimeter.

12. The layer system of claim 11, wherein each side of each recess is parallel to a respective side of the perimeter.

13. The layer system as claimed in claim 1, wherein each V-shaped or L-shaped recess comprises a corner that points toward the hole.

* * * * *